United States Patent [19]

McCoy

[11] Patent Number: 5,685,498
[45] Date of Patent: Nov. 11, 1997

[54] METHOD AND APPARATUS FOR PROCESSING RECYCLABLE MATERIAL

[75] Inventor: Donald E. McCoy, Spokane, Wash.

[73] Assignee: World Environmental Systems, Ltd. IBC, Nassau, Bahamas

[21] Appl. No.: 513,135

[22] Filed: Aug. 9, 1995

[51] Int. Cl.⁶ .................................................. B02C 19/12
[52] U.S. Cl. ..................... 241/24.14; 241/24.19; 241/275
[58] Field of Search ........................... 241/275, 24.11, 241/154, 188.1, 24.14, 53, 50, 24.19

[56] References Cited

U.S. PATENT DOCUMENTS

| | | |
|---|---|---|
| 3,065,919 | 11/1962 | Burkett. |
| 3,071,330 | 1/1963 | Jackering .................................. 241/53 |
| 3,160,354 | 12/1964 | Burkett. |
| 3,987,970 | 10/1976 | Burkett .................................. 241/275 X |
| 4,144,167 | 3/1979 | Burkett. |
| 4,151,794 | 5/1979 | Burkett. |
| 4,690,338 | 9/1987 | Sayler et al. ........................... 241/275 X |
| 4,877,531 | 10/1989 | Burkett. |
| 4,989,796 | 2/1991 | Eide. |
| 5,067,661 | 11/1991 | Eide. |
| 5,192,029 | 3/1993 | Harris. |
| 5,366,165 | 11/1994 | Jackman ............................ 241/24.11 X |

Primary Examiner—Mark Rosenbaum
Attorney, Agent, or Firm—Gary M. Polumbus; Dorsey & Whitney LLP

[57] ABSTRACT

There is disclosed a method and apparatus for processing material to produce recyclable waste. The material may be sorted, centrifugally milled and magnetically separated in a manner sufficient to produce multiple recyclable waste products.

32 Claims, 7 Drawing Sheets

Fig. 7

METHOD AND APPARATUS FOR PROCESSING RECYCLABLE MATERIAL

BACKGROUND OF THE INVENTION

1. Field of Invention.

This invention relates to the treatment of materials and more particularly to a method and apparatus for processing materials to produce recyclable waste.

2. Description of Relevant Art.

The ever-increasing waste disposal problems and interest in recycling of various materials has in recent years spurred the design and development of many systems and devices for processing waste and other materials either for more efficient disposal in land fills or for recycling purposes. Many elaborate systems and devices have emerged. To date none of these systems specifically target the recycling of filters; oil, gas and air for example.

There are approximately 200 million registered vehicles on the road in the United States, each of these undergoing three or more filter changes in any given year. The disposal of oil, gas and air filters, usually filled respectively with waste oil, gas and particulates, presents environmental and practical problems. The filters are generally composed of a metal shell, a filter paper interior, and an accompanying gasket. Disposal of the filters presents many recycling opportunities if it were possible to economically separate the various components of the filters. Traditional garbage shredders or centrifugal mills, however, rather than separating the components tend to entwine them more thoroughly than they are in the original filter thereby precluding any recycling possibilities. Therefore, a need exists for a method and apparatus for treating used filters in a manner which allows their various components to be recycled.

SUMMARY OF INVENTION

The present invention in general terms concerns an apparatus and method for processing materials such as used filters in a manner that allows for recycling of the various components of the filter. Those components are: an oil, gas or particulate saturated filter paper, a rubber o-ring and a metal housing. The apparatus consists of a plurality of parts including a sorting pan, a shredder, a centrifugal mill, a settling container, a magnetic separator, recycling containers for paper flocculate and for steel, and a fluid collection pan for oil or gas, along with various conveying means linking the various components of the apparatus.

In operation and with a specific reference to the processing of filters, the filters of various sizes are deposited in a sorting bin. The sorting bin has two outlets: one for filters of a standard size and the other for filters of an above standard size. The standard size conveyor transports filters of a standard size directly to the inlet of the centrifugal mill. Filters of a nonstandard size are passed by the above standard size conveyor to the shredder which breaks the filters down into a size approximating that of standard filters. At the output of the shredder the shredded above standard size filters are deposited on an above standard size shredded conveyor and transported to the intake of the centrifugal mill. Thus the intake of the centrifugal mill is presented with standard size filters and above standard size shredded filters.

At the intake of the centrifugal mill the filters are entrained in a highly turbulent incoming airstream. The airstream and fan blades rotating in the mill are believed to entrain the incoming filters in a helical path from intake to outlet. In the course of moving along this path the filters are subject to sufficient impacting and turbulence to first separate the filter's steel shell from the paper filter core and then to flocculate the paper which absorbs all liquid residue in the air stream and to simultaneously shard the steel shell into a recyclable size. A tangentially positioned outlet on the bottom perimeter of the centrifugal mill provides a high speed exit point for the turbulent waste stream consisting of air, oil or gas soaked flocculate, rubber o-rings and steel shard. The waste stream is captured in a settling bin. The steel shard impacts a settling bin wear guard which dampens its velocity and allows it to settle to the bottom of the settling bin. The flocculate also is collected on the bottom of the settling bin. All solid components of the waste stream are continuously removed from the settling bin by a settling bin conveyor which transports the solid waste to the settling bin outlet. The gaseous portion of the waste stream exits the settling bin through whatever environmental filtration units are required to remove oil or gas vapor from the air.

The solid portion of the waste stream is transported from the settling bin outlet by a waste stream conveyor. Intermediate the input and outlet of the waste stream conveyor is a magnetic separation conveyor. This physically removes the metal portion of the waste stream, specifically steel shard, and deposits it in the scrap steel recycling bin. The remaining portion of the waste stream, consisting of flocculate and rubber gaskets is deposited by the waste stream conveyor in the flocculate recycling bin. Intermediate the outlet of the waste stream conveyor and the input of the flocculate recycling bin, rubber gaskets which typically pass through the mill without change, may be removed manually, or by other suitable means.

Underlying the whole processing unit is an oil or gas collection pan to collect any drippings resulting from the process and to allow for the recycling of waste oil or gas. The apparatus and method disclosed thus allows for the processing at the input of used filters and the retrieval at the output of four recyclable waste components of those filters, specifically, used oil or gas, scrap steel shard, rubber o-rings and combustible oil or gas soaked flocculate, each having its own recycling market.

Accordingly, it is a primary object of the present invention to provide an environmentally responsible method for processing materials such as used filters in a manner which allows for recycling of the various components of those materials, and it is another object of the invention to provide an apparatus for practicing the method of processing such materials.

Other aspects, features and details of the present invention can be more completely understood by reference to the following detailed description of a preferred embodiment taken in conjunction with the drawings and the appended claims.

DESCRIPTION OF THE PREFERRED EMBODIMENT

Figure 1:
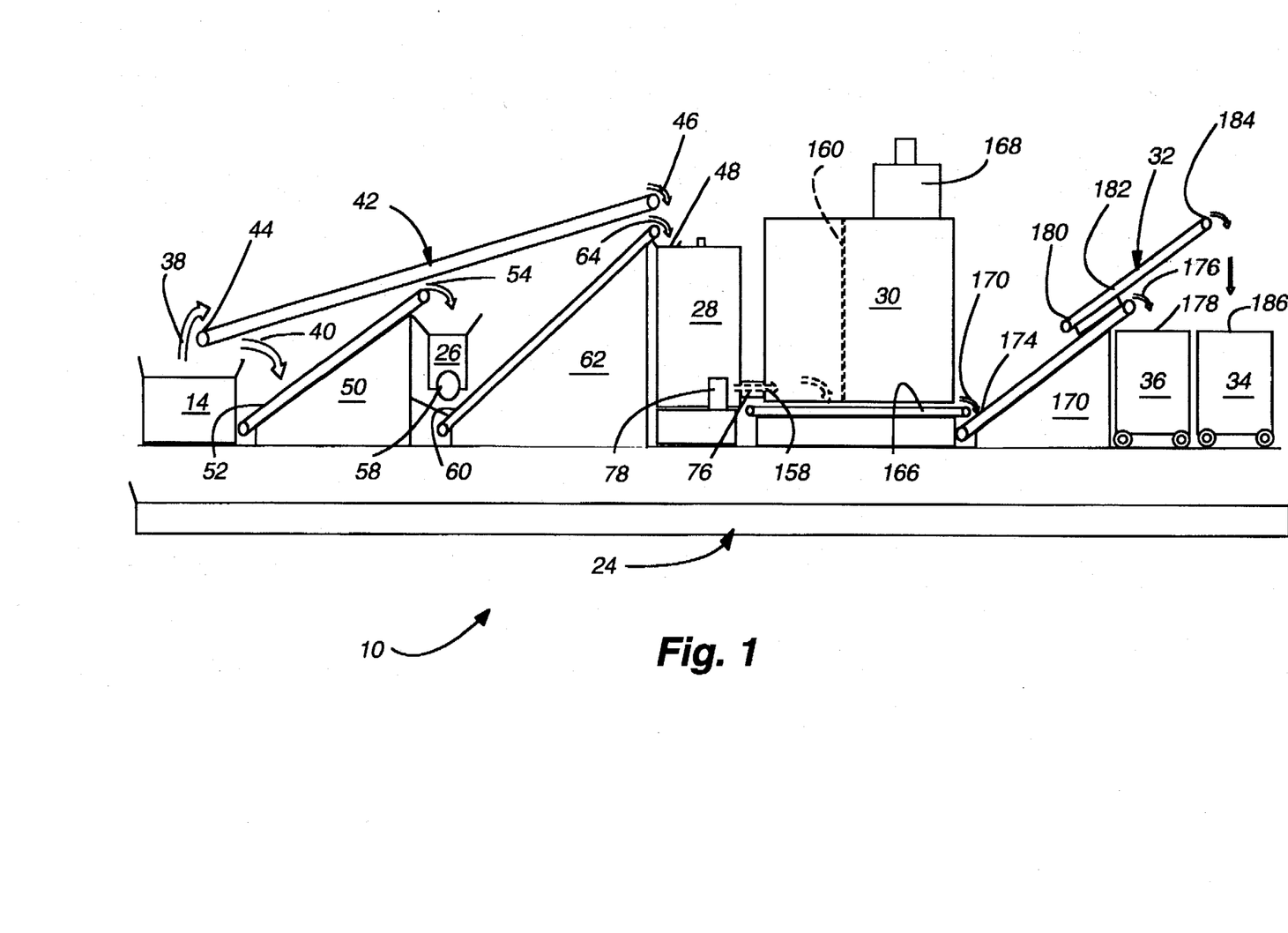
FIG. 1 is a side elevation of an oil filter processing system.

While the method and apparatus of the present invention may serve other desirable functions, for example, processing used paint or aerosol canisters or air or gas filters, for purposes of disclosure, it is being described as directed to the processing of used oil filters to produce a recyclable waste stream. In FIG. 1 a recycling system 10, for used oil filters of varying sizes is shown. Filters 12 are placed in a sorting bin 14 at the intake of the process and from these used oil filters four recyclable waste products are produced. The four recyclable waste products are scrap steel, combustible oil soaked flocculate, used oil, and rubber gaskets.

Figure 2:
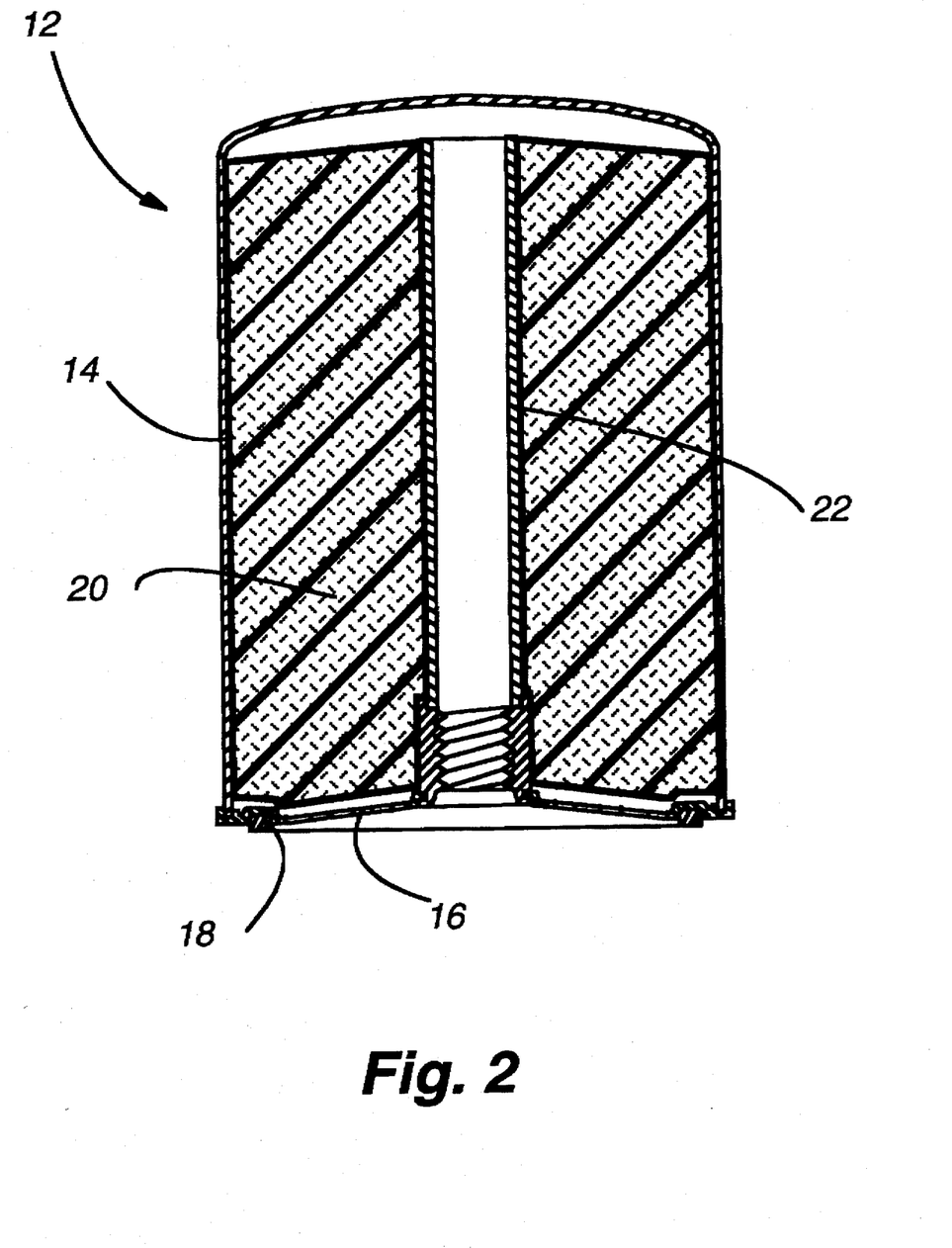
FIG. 2 is a cross-section of a typical oil filter for automotive use processed in the system of FIG. 1.
Figure 3:
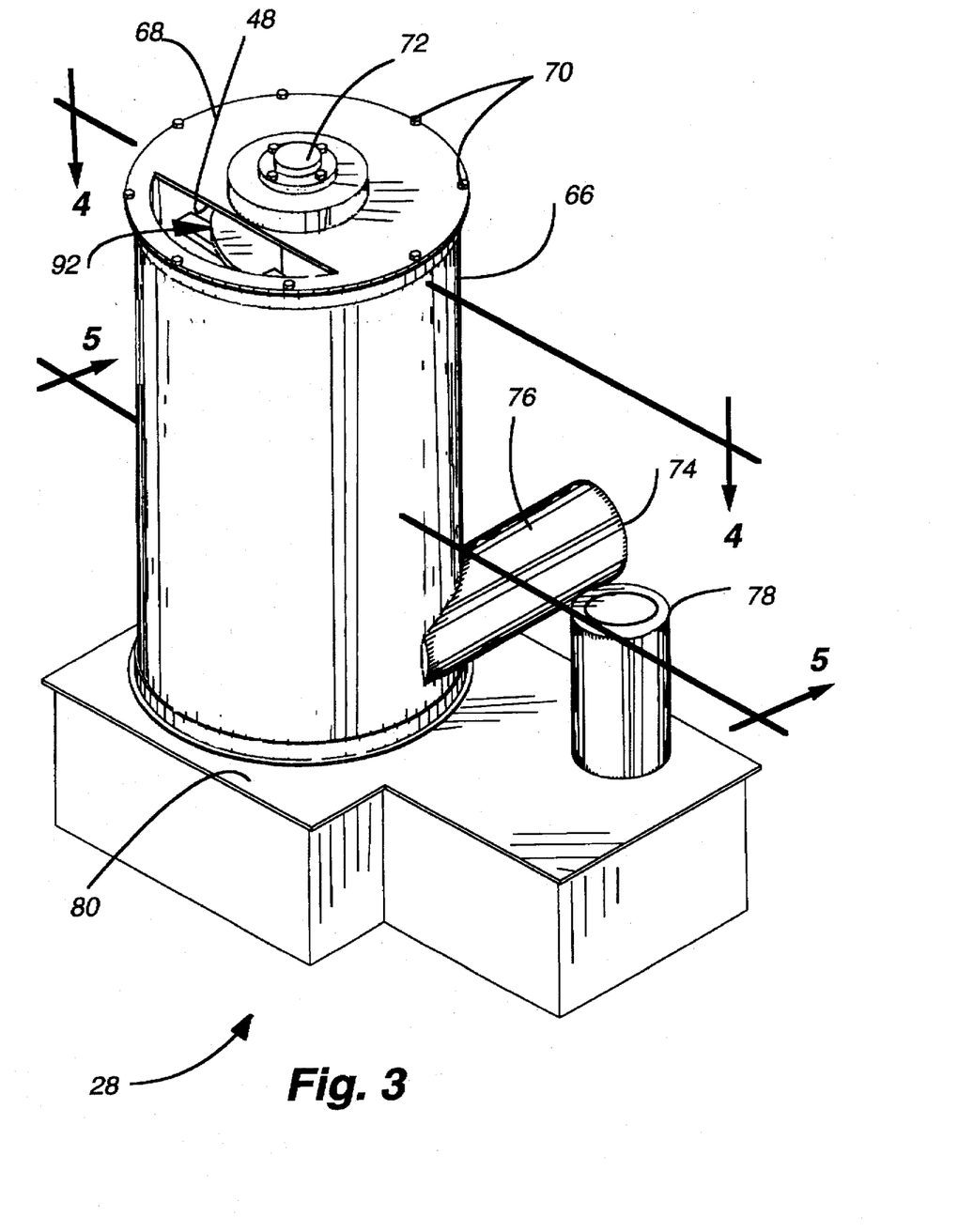
FIG. 3 is an isometric of a mill for processing automotive filters.
Figure 4:
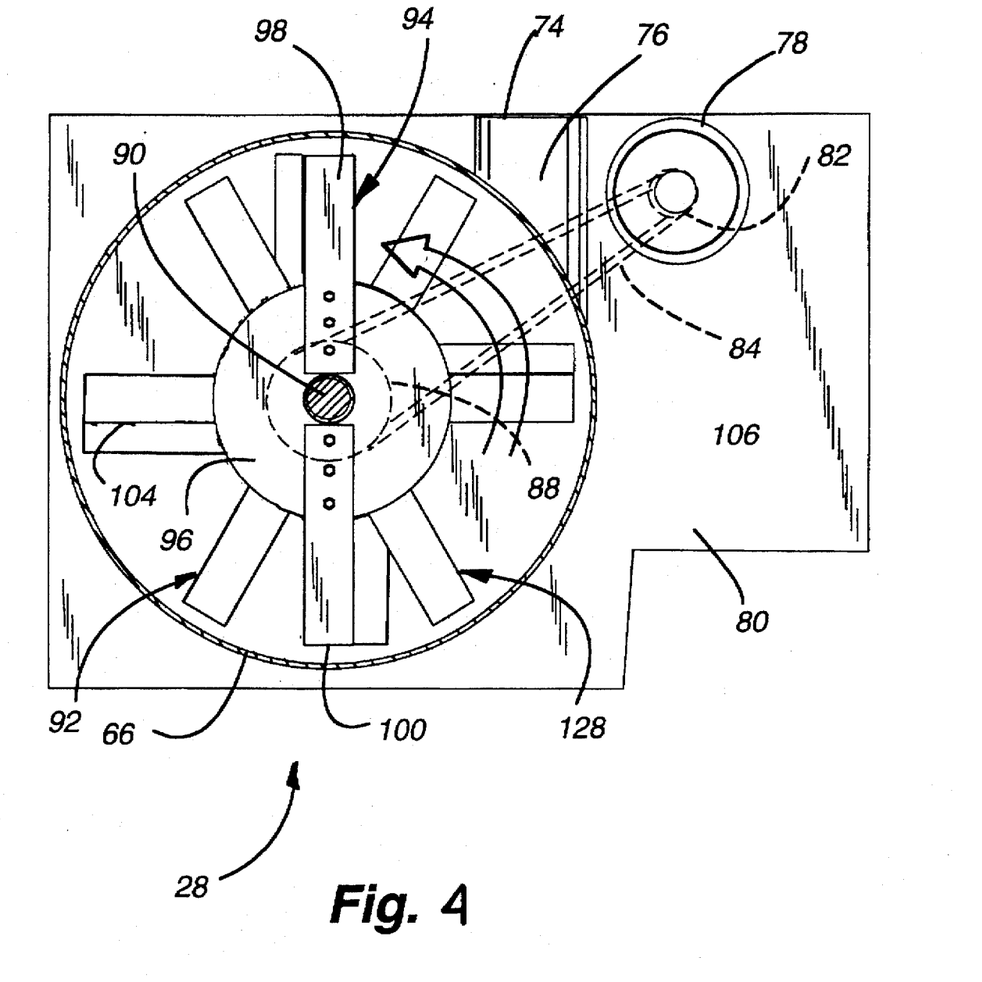
FIG. 4 is a horizontal cross-section taken along line 4—4 of FIG. 3.

An oil filter 12 of the type shown in FIG. 2 is the basic waste unit being processed. The oil filter of the conventional type is found in cars and trucks. The filter itself generally consists of a steel shell 14, a steel bottom plate 16, a rubber gasket 18 on the bottom plate, a filter paper 20 suitable for removing particulates from a lubricant oil stream, and a filter core 22 for directing the oil on its outgoing or return path.

The apparatus of the current invention consists generally of a large oil collection pan 24 over which are suspended in order from input to outlet: a sorting pan 14, an above standard size shredder 26, a centrifugal mill 28, a settling bin 30, a magnetic separator 32, and recycling bins for steel 34 and for oil soaked flocculate 36.

In greater detail, the sorting bin 14 into which standard size and above standard size used oil filters are deposited provides, through conventional vibratory or manual means, for the separation of those two filter sizes. Standard size filters exit the sorting bin at a standard size exit point 38. Above standard size filters exit the sorting bin at an above standard size exit 40. There are two conveyors connected to the sorting bin. The first conveyor, the standard size conveyor 42 has an input end 44 connected the standard size exit 38 and an output end 46 connected to the intake 48 of the centrifugal mill 28. The second conveyor, the above standard size conveyor 50 has an input end 52 connected to the above standard size exit 40 of the sorting bin and an output end 54 connected to the intake of a shredder 26. The shredder 26 accepts above standard size oil filters as input and outputs shredded above standard size oil filters having a size approximating that of a standard size oil filter. The output 58 of the shredder is connected to the input 60 of the above standard sized shredded conveyor 62. The output 64 of that conveyor is connected to the intake 48 of the centrifugal mill unit.

Figure 5:
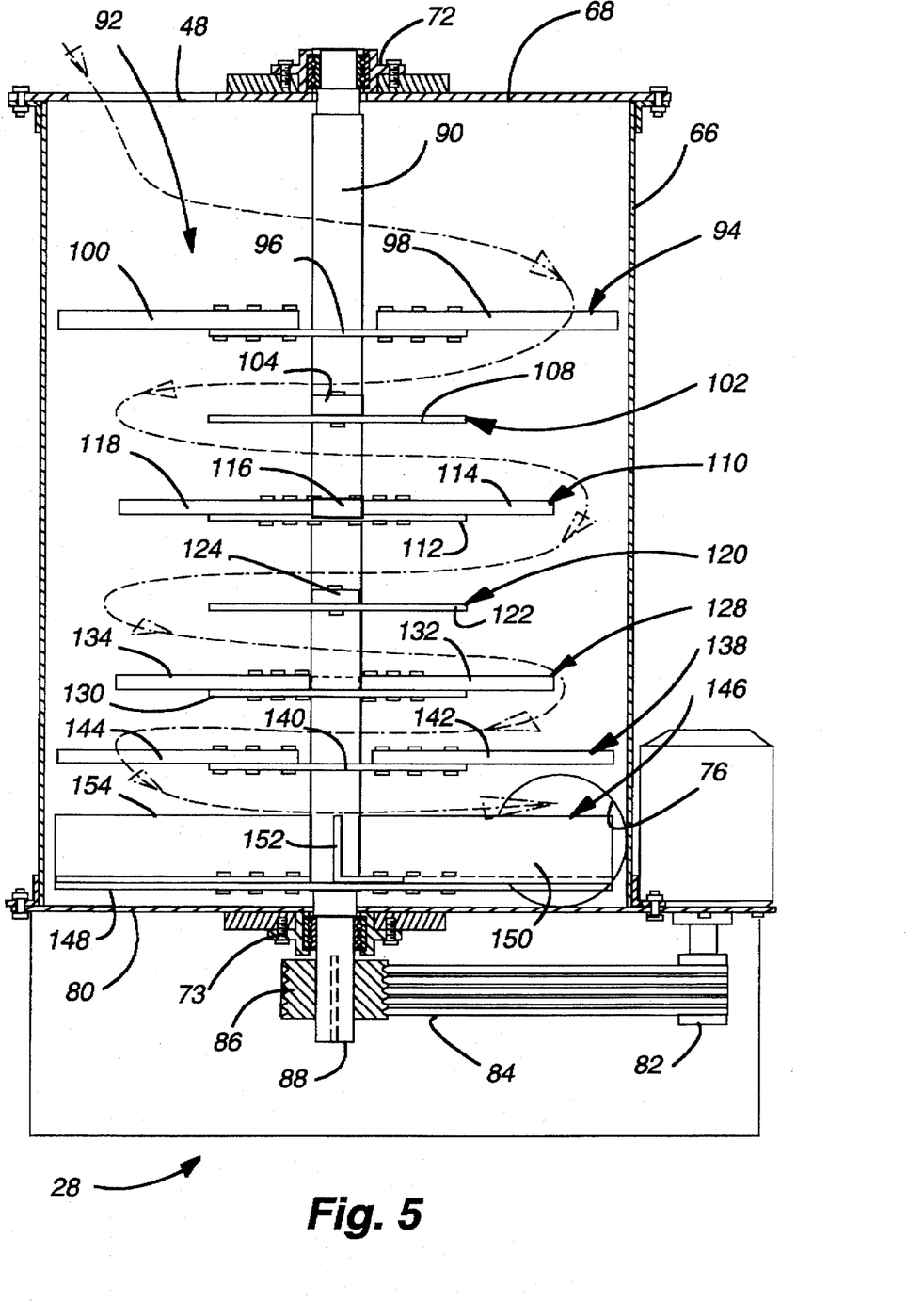
FIG. 5 is a horizontal cross-section taken along line 5—5 of FIG. 3.

The centrifugal mill 28 shown in FIGS. 3–7 consists of a cylindrical shell 66 having an inside diameter of approximately 44 inches and a height of approximately 60¾ inches. The top of the cylindrical chamber consists of a circular top plate 68, top plate tie down bolts 70, a centrally located top plate fan bearing assembly 72 and an intake opening 48 measuring approximately 30 inches by 15.5 inches. An outlet opening 74 having approximately ⅙th the area of the intake opening is provided in the cylindrical shell adjacent to the bottom thereof and in the preferred embodiment has a ten inch diameter pipe 76 tangentially intersecting the perimeter of the cylindrical shell, 90 degrees offset from the intake opening. A motor unit 78 (FIG. 4) of approximately 100 horsepower is mounted in a base support structure 80 and is connected by a motor pulley 82 and drive belts 84 to a fan shaft pulley 86. The motor unit 78 and pulleys 82, 86 are geared so as to drive the fan shaft pulley 86 at approximately 1300 rpm. The fan shaft 88 is best shown in FIG. 5 and consists of 4 inch diameter steel bar stock 90 appropriately machined to accommodate the fan blade unit assembly 92 and to fit in the bearing unit 72 in the top plate of the cylindrical chamber and a bearing unit 73 (FIG. 5) in a bottom plate 80 of the mill.

Figure 6:
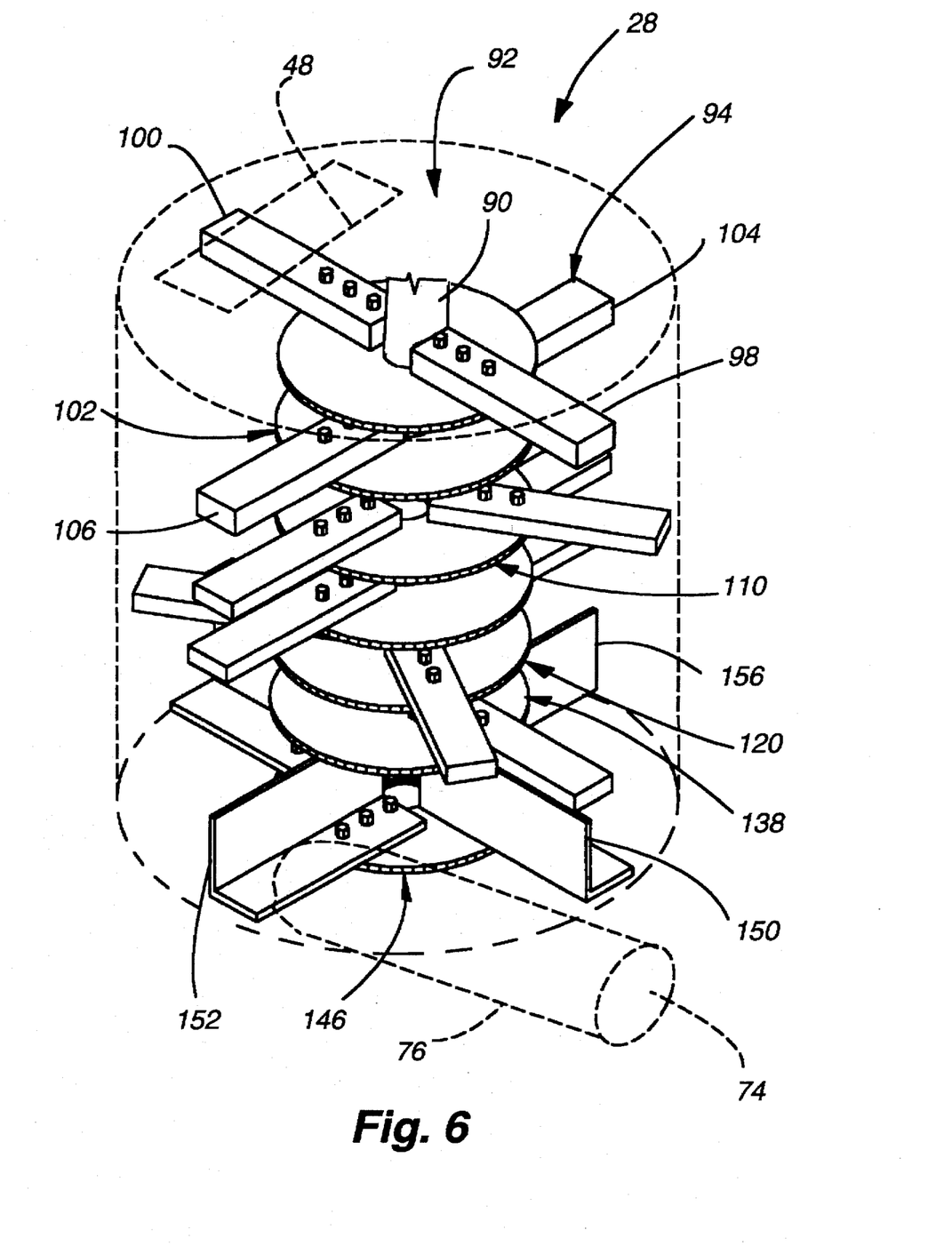
FIG. 6 is an isometric of the fan unit elements with the outside container shown in dashed lines.
Figure 7:
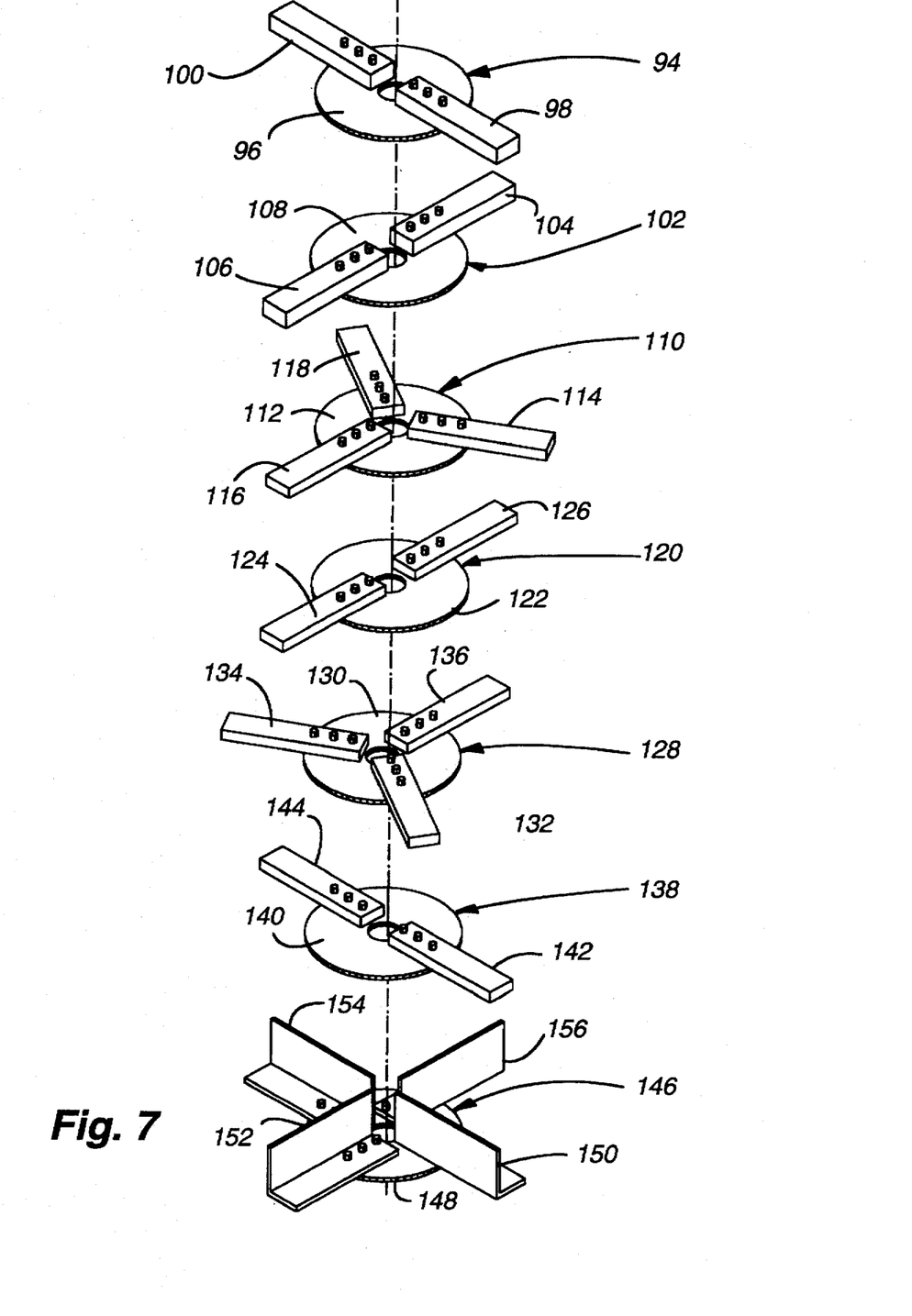
FIG. 7 is an exploded isometric of the fan blade units.

Attached to the fan shaft 90 at predefined intervals are a series of seven fan blade units each having a distinct purpose. The fan blades of each fan blade unit are secured to the fan shaft by a circular disc plate approximately ⅜ inch in thickness and 19.5 inches in diameter. The disc plates are rigidly mounted to the four inch diameter fan blade shaft 90 and rotate in unison therewith. All fan blades extend to within 1 inch of the interior wall of the cylindrical shell so that the tip of the fan blades define a radius for a fan blade unit that is approximately 45% less than the inside radius of the shell 66. The tips of the fan blades travel at a velocity of approximately 125 ft/sec.

The first and second fan blade units are comminutor blades. These separate the used oil filter shell from the filter paper. The first comminutor fan blade unit 94 consists of an anchored circular disk plate 96 to which are radially bolted two diametrically opposing fan blades 98, 100. The unit is anchored to the fan shaft 20⅛ inches distant from the top plate 68 of the mill. The second fan blade unit 102 is identical to the first, consisting of two diametrically opposed blades 104, 106, bolted to a circular anchor disk plate 108. The second comminutor fan blade unit is anchored 6⅛ inches below the first fan blade unit 94. Additionally, the two blades 104, 106 of this unit are offset 90 degrees with respect to the two blades 98, 100 of the first comminutor fan blade unit 1. In the preferred embodiment the comminutor fan blades 98, 100, 104, 106 are rectangular steel bar stock 1.5 inches thick, and four inches in width.

The third through sixth fan blade units are turbulator units which flocculate the filter paper and shard the oil filter steel shell. The third fan blade unit 110 consists of a circular anchored disc plate 112, to which are radially bolted three equally spaced fan blades 114, 116, 118 at an angle of 120 degrees relative to each adjacent fan blade. The unit is anchored to the fan shaft 7 inches beneath the second comminutor fan blade unit 102. The fourth fan blade unit 120 consists of an anchored disc plate 122, to which are radially bolted two diametrically opposed fan blades 124, 126 aligned with the fan blades 104 and 106 of the second fan blade unit. The unit is anchored to the fan shaft 6 and ⅝ inches below the third turbulator fan blade unit 110. The fifth fan blade unit 128 consists of an anchored disc plate 130, to which are radially bolted three equally spaced fan blades 132, 134, 136 at an angle of 120 degrees relative to each adjacent fan blade. The unit is anchored to the fan shaft 6 inches beneath the fourth turbulator fan blade unit 120. Additionally the three blades 132, 134, 136 of this unit are offset 60 degrees with respect to the three blades 114, 116, 118 of the third turbulator fan blade unit 110. The sixth fan blade unit 138 consists of an anchored disc plate 140, to which are radially bolted two equally spaced diametrically opposed fan blades 142, 144. The unit is anchored 5 and ⅛ inches beneath the fifth turbulator fan blade unit 128. Additionally the two blades 142, 144 of this unit are offset 90 degrees with respect to the two blades 124, 126 of the fourth turbulator fan blade unit 120. In the preferred embodiment the turbulator fan blades are rectangular steel bar stock 1.0 inches thick, and four inches in width.

The seventh and final fan blade unit 146 is an impeller unit. This fan blade creates the high volume airstream which carries the separated waste from the centrifugal mill 28. The last fan blade unit consists of an anchored disc plate 148, to which are radially bolted four equally spaced fan blades 150, 152, 154, 156 at an angle of 90 degrees relative to each adjacent fan blade. The unit is anchored to the fan shaft 8 and ⅜ inches beneath the sixth turbulator fan blade unit 138. In the preferred embodiment the impeller fan blades are angle iron having horizontal and vertical legs that are six inches wide and half-inch thick.

The tangential output 74 of the centrifugal fan unit 28 is connected in communication with the input 158 of the settling bin 30 and allows for the transport of the waste stream between the two. The settling bin in the preferred embodiment is a rectangular enclosure having four side walls and a top wall. The bin includes a wear guard 160 draped from the top wall and extending to the bottom of the settling bin. In the preferred embodiment the wear guard might consist of a series of chains suspended from the top wall. The floor of the settling bin is a continuous conveyor unit 166 moving from the input to the output. To process the large volume of air flow emanating from the centrifugal fan an air emission control unit 168 may be mounted on the top wall for filtering the exiting air stream according to local environmental regulations.

At the outlet 170 of the settling bin 30 a waste stream conveyor 172 input 174 is connected. The output of the waste stream conveyor 176 is adjacent to and overlies the input 178 of the flocculate recycling bin 36. Intermediate the input and the output of the waste stream conveyor is the 180 input of a magnetic separator conveyor 182. The magnetic separator conveyor may consist of a permanently magnetized belt which makes physical contact with the waste stream on the waste stream conveyor. Magnetic waste, in this case steel shard, adhering to the magnetized belt may be continuously scraped off the belt. The output 184 of the magnetic separator conveyor 182 is adjacent to and overlies the input 186 of the scrap steel recycling bin 34.

Finally, the recycling apparatus includes an oil collection pan 24 underlying all of the above mentioned components, so as to collect any oil drippings from any component of the system.

In operation oil filters of varying sizes are deposited in the sorting bin 14. Standard and above standard size oil filters are therein separated. Sorting can be manual or more efficiently by a vibratory feed system using known technology which separates standard sized oil filters placing them on the input 38 of the standard size conveyor 42 and above standard size oil filters placing them on the input 52 of the above standard size conveyor 50.

The standard size oil filters are transported to the intake 48 of the centrifugal mill 28. The above standard size oil filters are transported to the shredder 26. The shredder reduces the size of the above standard size oil filters to a size approximating that of a standard sized filter. The shredder may function by grinding the filters between opposing wheels or by an impeller motion of an impact blade in a manner that is well known in the grinding art. In either case above standard sized used oil filters must be sufficiently shredded to reduce their size to that approximating a standard sized oil filter. The shredder unit however, preferably does not reduce the size of the above standard sized units so much as to entwine metal and filter paper in a manner that prevents their subsequent separation into a recyclable waste stream. At its output 58 the shredder 26 deposits the shredded mass on an above standard size shredded conveyor 62 which conveyor transports the shredded oil filters to the intake 48 of the centrifugal mill 28. The next step is for the centrifugal mill to accept the input of standard size and above standard size shredded used oil filters and to turn them into a recyclable separable waste stream. A high volume of air, approximately 10,000 cubic feet per minute, is entrained into the centrifugal chamber 28 by the fan blade units 92. The first two fan blade units 94, 102 are comminutor fan blade units impact the oil filters and separate the oil filter shell, the paper core, and the gasket.

The third through sixth fan blade units 110, 120, 128, 138 turbulate the air stream and the entrained oil filter materials flocculating the paper and causing it to absorb all oil residue. These blade units also take the oil filter steel shell 66 and shard it into suitable sizes for recycling. The dwell time of the waste products in the air stream is determined by the ratio of the intake 48 to the outlet 74 area of the centrifugal mill 28. This is adjustable by means of a sliding intake baffle, not shown, and is generally in the ratio of 6 to 1. This results in sufficient dwell time to allow the waste stream to be separated into various recyclable by products. The seventh fan blade unit 146 forces the air stream into the tangential exit at the base of the chamber from which the waste stream is directed to the intake 158 of the settling bin 30.

The wear guard baffle 160 in the settling bin 30 intercepts the metal shard and thereby reduces the wear of that shard on the back wall of the settling bin. The recyclable components of the waste stream settle to the bottom of the settling bin and are transported therefrom by the conveyor 166 to the exit 170 of the settling bin 30. The large volume of air received by the settling bin can be environmentally processed with the filtering device 168 in the settling bin to meet local environmental requirements. The next step in the process is to take the waste stream from the settling bin conveyor 166 and pass it to the waste stream conveyor 170. The waste stream at this point consists of rubber gaskets, oil soaked filter paper, flocculate, and steel shard. The steel shard is independently recyclable, and therefore the next step in the process is to pass the waste stream through a magnetic separation device 32. There are several types of magnetic separators which can be used, one of which is a series of permanent magnets on a belt. When positioned so as to provide physical contact between the belt and the waste stream, on the waste stream conveyor, the permanent magnets tend to lift the steel shard from the waste stream conveyor 170. The steel shard is then mechanically removed from the magnets, by scraping, and deposited in the scrap steel recycling container 34. The waste stream, thus deprived of recyclable magnetic steel products is transported to the flocculate recycling container 36. It may be desirable to remove rubber gaskets from this flocculate waste stream and this can be achieved either manually or by a conventional vibratory separation mechanism. The waste stream thus separated consists of four recyclable products, specifically steel shard, oil soaked flocculate filter paper, rubber gaskets, and oil residue collected continuously at all points along the apparatus by an underlying oil pan 24.

In another preferred embodiment not having to do with filters, the aforementioned apparatus and method could be advantageously used to process other materials such as paint containers or aerosol cans. The method and apparatus of processing would be similar to that disclosed in connection with oil filters, the only exception being that the recyclable components would be limited to liquid paint residue or the like collected in pan 24, metal shard collected in container 34 and, in the absence of waste paper, there would be no flocculate collection. It might, however, be advantageous to introduce waste paper into the waste stream in order to soak up any liquid residue and thereby possibly produce a combustible recyclable resource.

While there has been described above the principles of the present invention in conjunction with specific apparatus, it is to be clearly understood that the foregoing description is made only by way of example and not as a limitation to the scope of the invention.

What is claimed is:

1. A centrifugal mill for processing used filters, said filters having a metal housing, and a gas, liquid or particulate saturated filter paper core, to produce a separable waste stream of flocculated saturated filter paper and metal housing shard, comprising:

a cylindrical chamber elongate about a generally vertical axis having a top and bottom cap and an uninterrupted interior cylindrical surface devoid of any protuberances;

an intake opening providing for the introduction of filters into said chamber;

an outlet opening providing for the removal of the separable waste stream from said chamber;

means for adjusting the ratio of the sizes of the intake and outlet openings;

a driven shaft rotatably positioned along said vertical axis of said cylindrical chamber; and a set of axially spaced fan blade units attached to said driven shaft about said vertical axis of said chamber and arranged so as to entrain the filters in a turbulent airstream from said intake to said outlet, to break apart by impact the filter paper from the metal filter housing, to flocculate by turbulence the filter paper, to shard the metal housing and to forcibly deliver the entrained separable waste stream to said outlet opening.

2. The centrifugal mill of claim 1 in which the tip of each fan blade defines a a radius for a fan blade unit that is approximately 4.5 percent less than the radius of said interior surface of said cylindrical chamber.

3. The centrifugal mill of claim 2 in which a tip portion of each fan blade has a tip velocity of approximately 125 feet per second.

4. The centrifugal mill of claim 3 in which the ratio of the cross-sectional size of the intake to the outlet opening is approximately six to one.

5. The centrifugal mill of claim 4 in which the turbulent airstream follows a helical path of generally constant radius.

6. The centrifugal mill of claim 1 in which a set consists of at least seven fan blade units.

7. The centrifugal mill of claim 6 in which fan blade units are axially spaced apart at intervals in the range between five and nine inches.

8. The centrifugal mill of claim 7 in which the top two fan blade units have two blades, the next four fan blade units have alternately three blades and two blades and the bottom fan blade unit has four blades.

9. The centrifugal mill of claim 8 in which the turbulent airstream follows a helical path of generally constant radius.

10. A system for processing used filters, said filters having a metal housing and a gas, liquid or particulate saturated filter paper core, to produce a separable waste stream of flocculated saturated filter paper and metal housing chard, comprising:

a cylindrical chamber elongate about a generally vertical axis having a top and bottom cap and an uninterrupted interior cylindrical surface devoid of any protuberances;

an intake opening providing for the introduction of filters into said chamber;

an outlet opening providing for the removal of the separable waste stream from said chamber;

means for adjusting the ratio of the size of the intake and outlet openings;

a driven shaft rotatably positioned along said vertical axis of said cylindrical chamber;

a set of axially spaced fan blade units attached to said driven shaft about said vertical axis of said chamber and arranged so as to entrain the filters in a turbulent airstream from said intake to said outlet, to break apart by impact the filter paper from the metal filter housing, to flocculate by turbulence the filter paper, to shard the metal housing and to forcibly deliver the entrained separable waste stream to said outlet opening;

means for presenting filters having substantially uniform size parameters to said cylindrical chamber;

means at said cylindrical chamber outlet opening for separating said separable waste stream into flocculate and scrap metal;

a collection pan for accumulating residue from each of the above portions of the system.

11. The system of claim 10 wherein said means for presenting filters having uniform size parameters comprises:

sorting means for separating filters of a standard size from filters having an above standard size;

a shredder device capable of taking at an input said filters having an above standard size and shreddably reducing said filters and outputting filter matter of an acceptable size;

conveyor devices for transporting said standard size filters from said sorting means to said intake opening of said cylindrical chamber;

conveyor devices for transporting said above standard size filters from said sorting means to said shredder device; and conveyor devices for transporting said filter matter from said shredder device to said intake opening of said cylindrical chamber.

12. The system of claim 10 wherein said means at said cylindrical chamber outlet opening for separating said separable waste steam comprises:

a settling bin having a bin inlet operatively associated with said outlet opening and providing for the continuous collection and removal by conveyor to a bin outlet of the turbulent separable waste stream emanating from said cylindrical chamber; and a magnetic separator affixed to said settling bin outlet to remove steel shard from said separable waste stream.

13. The system of claim 12 in which the tip of each fan blade defines a a radius for a fan blade unit that is approximately 4.5. percent less than the radius of said interior surface of said cylindrical chamber.

14. The system of claim 13 in which a tip portion of each fan blade has a tip velocity of approximately 125 feet per second.

15. The system of claim 14 in which the ratio of the cross-sectional size of the intake to the outlet opening is approximately six to one.

16. The centrifugal mill of claim 15 in which the turbulent airstream follows a helical path of generally constant radius.

17. The system of claim 10 in which a set consists of at least seven fan blade units.

18. The system of claim 17 in which fan blade units are axially spaced apart at intervals in the range between five and nine inches.

19. The system of claim 15 in which the top two fan blade units have two blades, the next four fan blade units have alternately three blades and two blades and the bottom fan blade unit has four blades.

20. The centrifugal mill of claim 19 in which the turbulent airstream follows a helical path of generally constant radius.

21. A method for processing used filters, said filters having a metal housing and a filter paper core, to produce a separable waste stream consisting of flocculated filter paper and metal housing shard, comprising:

separating used filters into a standard and nonstandard size;

shreddably reducing said nonstandard filters to a standard size;

entraining said shreddably reduced and standard size used filters in a turbulent helical airstream constrained to a generally constant radius;

forcibly impacting said filters in said turbulent helical airstream to separate the filter paper from the metal filter housing;

turbulently flocculating the filter paper and sharding the metal housings;

funneling said turbulent airstream containing said flocculate filter paper and shard metal to a settling tank; and magnetically separating said shard metal from said flocculate.

22. A method for processing used filters, said filters having a metal housing and a filter paper core, to produce a separable waste stream consisting of flocculated filter paper and metal housing shard, comprising:

entraining the used filters in a turbulent helical airstream constrained to a generally constant radius;

forcibly impacting said filters in said turbulent helical airstream to separate the filter paper from the metal filter housing;

turbulently flocculating the filter paper;

sharding the metal housing; and funneling said turbulent airstream containing said flocculated filter paper and shard metal to a settling tank.

23. A centrifugal mill for processing material comprising:

a cylindrical chamber elongate about a generally vertical axis having a top and bottom cap and an uninterrupted interior cylindrical surface devoid of any protuberances.

an intake opening providing for the introduction of material into said chamber;

an outlet opening providing for the removal of waste from said chamber;

means for adjusting the ratio of the sizes of the intake and outlet openings;

a driven shaft rotatably positioned substantially along said vertical axis of said cylindrical chamber;

a set of axially spaced fan blade units attached to said driven shaft about said vertical axis of said chamber and arranged so as to entrain the material in a turbulent airstream from said intake to said outlet, to break apart by impact and by turbulence the material, to shard the material and to forcibly deliver the entrained material to said outlet opening.

24. The centrifugal mill of claim 23 in which the tip of each fan blade defines a a radius for a fan blade unit that is approximately 4.5 percent less than the radius of said interior surface of said cylindrical chamber.

25. The centrifugal mill of claim 24 in which a tip portion of each fan blade has a tip velocity of approximately 125 feet per second.

26. The centrifugal mill of claim 25 in which the ratio of the cross-sectional size of the intake to the outlet opening is approximately six to one.

27. The centrifugal mill of claim 26 in which the turbulent airstream follows a helical path of generally constant radius.

28. The centrifugal mill of claim 23 in which a set consists of at least seven fan blade units.

29. The centrifugal mill of claim 28 in which fan blade units are axially spaced apart at intervals in the range between five and nine inches.

30. The centrifugal mill of claim 29 in which the top two fan blade units have two blades, the next four fan blade units have alternately three blades and two blades and the bottom fan blade unit has four blades.

31. The centrifugal mill of claim 30 in which the turbulent airstream follows a helical path of generally constant radius.

32. A centrifugal mill for processing used filters, said filters having a metal housing, and a gas, liquid or particulate saturated filter paper core, to produce a separable waste stream of flocculated saturated filter paper and metal housing shard, comprising:

a cylindrical chamber elongate about a generally vertical axis and having a top and bottom cap;

an intake opening providing for the introduction of filters into said chamber;

an outlet opening providing for the removal of the separable waste stream from said chamber;

means for adjusting the ratio of the sizes of the intake and outlet openings;

a driven shaft rotatably positioned along said vertical axis of said cylindrical chamber;

a set of axially spaced fan blade units attached to said driven shaft about said vertical axis of said chamber and arranged so as to entrain the filters in a turbulent helical flow path from said intake to said outlet, to break apart by impact the filter paper from the metal filter housing, to flocculate by turbulence the filter paper, to shard the metal housing and to forcibly deliver the helically entrained separable waste stream to said opening.

* * * * *